(12) United States Patent
Van Elburg et al.

(10) Patent No.: US 8,150,969 B2
(45) Date of Patent: *Apr. 3, 2012

(54) GROUP ACCESS TO IP MULTIMEDIA SUBSYSTEM SERVICE

(75) Inventors: Johannes Van Elburg, Oosterhout (NL); Patrick Timmers, Utrecht (NL); Rogier Noldus, Goirle (NL); Joost Herman Bosschert, Breda (NL); Gert Oster, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/222,093

(22) Filed: Aug. 31, 2011

(65) Prior Publication Data

US 2011/0314169 A1 Dec. 22, 2011

Related U.S. Application Data

(63) Continuation of application No. 12/528,201, filed as application No. PCT/EP2007/051720 on Feb. 22, 2007.

(51) Int. Cl.
*G06F 15/173* (2006.01)
*H04L 12/66* (2006.01)
*H04L 12/88* (2006.01)

(52) U.S. Cl. ............... 709/225; 709/230; 455/435.1; 370/352; 370/401; 370/389

(58) Field of Classification Search .......... 709/225, 709/230; 370/352, 389, 401; 455/435.1
See application file for complete search history.

(56) References Cited

U.S. PATENT DOCUMENTS

| | | | | |
|---|---|---|---|---|
| 7,590,073 | B2* | 9/2009 | Beckmann et al. | 370/254 |
| 7,664,497 | B2* | 2/2010 | Willey et al. | 455/435.1 |
| 7,796,990 | B2* | 9/2010 | Matuszewski et al. | 455/435.1 |
| 7,835,352 | B2* | 11/2010 | Zhu et al. | 370/389 |
| 7,979,081 | B1* | 7/2011 | Sharobim | 455/458 |
| 8,068,818 | B2* | 11/2011 | Westman | 455/414.1 |
| 2005/0131989 | A1* | 6/2005 | Beckmann et al. | 709/201 |
| 2006/0035637 | A1* | 2/2006 | Westman | 455/435.3 |
| 2006/0045102 | A1* | 3/2006 | Pelaez et al. | 370/401 |
| 2006/0182129 | A1* | 8/2006 | Mutch et al. | 370/401 |
| 2007/0121584 | A1* | 5/2007 | Qiu et al. | 370/352 |
| 2007/0121622 | A1* | 5/2007 | Zhu et al. | 370/389 |
| 2007/0195805 | A1* | 8/2007 | Lindgren | 370/401 |
| 2008/0003957 | A1* | 1/2008 | Schwagmann et al. | 455/91 |
| 2008/0032695 | A1* | 2/2008 | Zhu et al. | 455/442 |
| 2008/0039086 | A1* | 2/2008 | Gallagher et al. | 455/435.1 |
| 2008/0070543 | A1* | 3/2008 | Matuszewski et al. | 455/404.1 |
| 2008/0101582 | A1* | 5/2008 | Hua et al. | 379/220.01 |
| 2008/0126541 | A1* | 5/2008 | Rosenberg et al. | 709/225 |

(Continued)

*Primary Examiner* — Alina N. Boutah

(57) ABSTRACT

A method of facilitating access to services of an IP Multimedia Subsystem network by user terminals and services located behind an access point to said network. The access point is associated with a subscription to the IP Multimedia Subsystem network. The method comprises including within an Implicit Registration Set defined for said subscription, a wildcarded Public User Identity, Public Service Identity, Public User Identity sub-domain representative of a range of Public User Identities, or Public Service Identity sub-domain representative of a range of Public Service Identities. At IP Multimedia Subsystem registration of said access point with the IP Multimedia Subsystem network, the Public User Identities and Service Identities contained in the Implicit Registration Set are distributed to a Serving Call Session Control Function allocated to said access point and to a Proxy Call Session Control Function to which said access point is attached.

14 Claims, 6 Drawing Sheets

U.S. PATENT DOCUMENTS

| | | | |
|---|---|---|---|
| 2008/0176538 A1* | 7/2008 | Terrill et al. ................ | 455/414.1 |
| 2008/0194258 A1* | 8/2008 | Chiu et al. ................. | 455/435.1 |
| 2009/0215453 A1* | 8/2009 | Blanco Blanco et al. .. | 455/435.1 |
| 2009/0227236 A1* | 9/2009 | Sanchez Herrero et al. .......................... | 455/414.1 |
| 2009/0253431 A1* | 10/2009 | Shi et al. .................... | 455/435.1 |
| 2010/0011004 A1* | 1/2010 | Rajko et al. ..................... | 707/10 |
| 2010/0118860 A1* | 5/2010 | Dahlin et al. ................. | 370/352 |
| 2010/0232402 A1* | 9/2010 | Przybysz ...................... | 370/338 |
| 2010/0273482 A1* | 10/2010 | Jain et al. ................... | 455/435.1 |
| 2010/0325275 A1 | 12/2010 | Van Elburg et al. | |
| 2011/0060771 A1* | 3/2011 | Llorente et al. ............... | 707/812 |

* cited by examiner

GROUP ACCESS TO IP MULTIMEDIA SUBSYSTEM SERVICE

CROSS REFERENCE TO RELATED APPLICATIONS

This application is a continuation of U.S. application Ser. No. 12/528,201, filed Mar. 25, 2010, now pending, which was the National Stage of International Application No. PCT/EP2007/051720, filed Feb. 22, 2007, the disclosure of which is incorporated herein by reference.

TECHNICAL FIELD

The present invention relates to group access to IP Multimedia Subsystem services and in particular to facilitating such access to users that do not have individual IP Multimedia Subsystem subscriptions but belong to a group that does.

BACKGROUND

IP Multimedia Subsystem (IMS) is the technology defined by the Third Generation Partnership Project (3GPP) to provide IP Multimedia services over mobile communication networks (3GPP TS 22.228). IMS provides key features to enrich the end-user person-to-person communication experience through the integration and Interaction of services. IMS allows new rich person-to-person (client-to-client) as well as person-to-content (client-to-server) communications over an IP-based network.

The IMS makes use of the Session Initiation Protocol (SIP) to set up and control calls or sessions between user terminals (UEs) or between UEs and application servers (ASs). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Within an IMS network, Call/Session Control Functions (CSCFs) operate as SIP entities within the IMS. The 3GPP architecture defines three types of CSCFs: the Proxy CSCF (PCSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

IMS service functionality is implemented using application servers (ASs). For any given UE, one or more ASs may be associated with that terminal. ASs communicate with an S-CSCF via the IMS Service Control (ISC) interface and are linked into a SIP messaging route as required (e.g. as a result of the triggering of IFCs downloaded into the S-CSCF for a given UE).

A user registers in the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user using subscription information stored in a Home Subscriber Server (HSS), and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling, and charging for, user access to IMS-based services. Operators may provide a mechanism for preventing direct user-to-user SIP sessions which would otherwise bypass the S-CSCF.

During the registration process, it is the responsibility of the I-CSCF to select an S-CSCF, if an S-CSCF is not already selected. The I-CSCF receives the required S-CSCF capabilities from the HSS, and selects an appropriate S-CSCF based on the received capabilities. It is noted that S-CSCF allocation is also carried for a user by the I-CSCF in the case where the user is called by another party, and the user is not currently allocated an S-CSCF. When a registered user subsequently sends a session request to the IMS, the P-CSCF is able to forward the request to the selected S-CSCF based on information received from the S-CSCF during the registration process.

Every IMS user possesses one or more Private User Identities. A Private User Identity is assigned by the home network operator and is used by the IMS, for example for registration, authorisation, administration, and accounting purposes. This identity takes the form of a Network Access Identifier (NAI) as defined in IETF RFC 2486. It is possible for a representation of the International Mobile Subscriber Identity (IMSI) to be contained within the NAI for the private identity. 3GPP TS 23.228 specifies the following properties of the Private User Identity:

- The Private User Identity is not used for routing of SIP messages.
- The Private User Identity shall be contained in all Registration requests, (including Re-registration and De-registration requests) passed from the UE to the home network.
- An IP multimedia Services Identity Module (ISIM) application shall securely store one Private User Identity. It shall not be possible for the UE to modify the Private User Identity information stored on the ISIM application.
- The Private User Identity is a unique global identity defined by the Home Network Operator, which may be used within the home network to identify the user's subscription (e.g. IM service capability) from a network perspective. The Private User Identity identifies the subscription, not the user.
- The Private User Identity shall be permanently allocated to a user's subscription (it is not a dynamic identity), and is valid for the duration of the user's subscription with the home network.
- The Private User Identity is used to identify the users information (for example authentication information) stored within the HSS (for use for example during Registration).
- The Private User Identity may be present in charging records based on operator policies.
- The Private User Identity is authenticated only during registration of the user, (including re-registration and de-registration).
- The HSS needs to store the Private User Identity.
- The S-CSCF needs to obtain and store the Private User Identity upon registration and unregistered termination.

In addition to a Private User Identity, every IMS user shall have one or more IMS Public User Identities (PUIs). The PUIs are used by any user to request communications to other users. A user might for example include an PUI (but not a Private User Identity) on a business card. 3GPP TS 23.228 specifies the following properties of the PUI:

- Both telecom numbering and Internet naming schemes can be used to address users depending on the PUIs that the users have.

The PUI(s) shall take the form of a SIP URI (as defined in RFC 3261 and RFC 2396 or the "tel:"-URI format defined in RFC 3966.

An ISIM application shall securely store at least one PUI (it shall not be possible for the UE to modify the PUI), but it is not required that all additional PUIs be stored on the ISIM application.

An PUI shall be registered either explicitly or implicitly before the identity can be used to originate IMS sessions and IMS session unrelated procedures.

An PUI shall be registered either explicitly or implicitly before terminating IMS sessions and terminating IMS session unrelated procedures can be delivered to the UE of the user that the PUI belongs to.

It shall be possible to register globally (i.e. through one single UE request) a user that has more than one PUI via a mechanism within the IMS (e.g. by using an Implicit Registration Set). This shall not preclude the user from registering individually some of his/her PUIs if needed.

PUIs are not authenticated by the network during registration.

PUIs may be used to identify the user's information within the HSS (for example during mobile terminated session set-up).

PUIs may be used by ASs within the IMS to identify service configuration data to be applied to a user.

FIG. 1 illustrates schematically example relationships between a user (IMS) subscription and the Public and Private User Identities. In the example shown, a subscriber has two Private User Identities, with both being associated with two Public User Identities (one of the Public User Identities, Public User Identities-2, being associated with both Private User Identities), A Service Profile is associated with each Public User Identity, this profile specifying service data for the associated Public User Identities. A Service Profile is created or modified when an application server is provisioned for a user at the Home Subscriber Server. Each Service Profile comprises one or more initial Filter Criteria (FC) which are used to trigger the provision, or restriction, of IMS services. The differences between services offered by Service Profile-1 and Service Profile-2 are operator specific, but may involve different application servers (ASs), and even different charging/rating schemes.

In the example, Public User Identity-1 is associated with a Service Profile-1, whilst Public User Identity-2 and Public User Identity-3 are associated with Service Profile-2. In a typical scenario, the Public User Identity-1 might be an identity that the user gives to friends and family, e.g. "Big_Joe@priv.operator.com", whilst Public User Identity-2 and Public User Identity-3 might be identities that the user gives to business contacts, e.g. "+46111222333@operator.com" and "joe.black@operator.com".

3GPP defines a so-called "implicit Registration Set" concept to identify a set of PUIs that work as a group, and which are registered and deregistered together when any one of the PUIs of the set is registered or deregistered. 3GPP mandates that the HSS send the Implicit Registration Set to the S-CSCF upon registration of a user or upon terminating a call. It has been understood that (at registration) the HSS identifies all PUIs within the Implicit Registration Set, and then identifies all of the Service Profiles associated with these PUIs. The Service Profiles (or selected data from the Service Profiles) containing the PUIs with which they are associated, are then sent to the S-CSCF. As a result of this operation, the S-CSCF knows all of the PUIs that belong to the same Implicit Registration Set, as well as theft Service Profiles.

A possible use case of the IMS involves a collection of users having a group level subscription to the IMS, but where the individual users themselves have no subscription and of which the IMS is unaware. Nonetheless, it is desirable or even necessary to allow direct inward and outward dialing to the users. This might arise, for example, in the case of an enterprise having a subscription to the IMS and having individual employee stations or terminals attached to an IP private branch exchange (IP-PBX). The employee terminals may or may not be provided with SIP clients. In the latter case, the IP-PBX performs a translation between SIP and non-SIP signalling. Whilst it might of course be possible for the IMS to record an individual PUI for each terminal (within the same Implicit Registration Set), this becomes inefficient as the group size becomes large. ETSI TISPAN defines such a corporate network as a Next Generation Corporate Network (NGCN).

An alternative solution is illustrated schematically in FIG. 2 which shows an IP-PBX (designated "IP-PBX 2") which serves a plurality of user terminals, one of which is shown in the Figure as "Ext, 5678". This solution employs the so-called Public Service Identity (PSI) which is intended to identify publicly available network-based IMS services, rather than user to user service. The solution defines within the HSS a wildcarded PSI which matches the PUIs specified for the terminals belonging to IP-PBX 2.

In the terminating case, when a SIP message, e.g. an INVITE, is received at an I-CSCF of the home IMS network (via an Interconnected Border Control Function, I-BCF), the I-CSCF will recognise a SIP request URI corresponding to a telephone number and will convert this to a Tel URI. In the example of FIG. 2, the SIP request URI is "sip:+31161255678@operator2.com,user=phone", and this is converted to the Tel URI "Tel:+31161255678". The I-CSCF then sends a query to the HSS according to normal IMS procedures. The HSS determines that the Tel URI matches a PSI wildcard, and responds to the I-CSCF with the identity of the allocated S-CSCF. The I-CSCF forwards the SIP message to the allocated S-CSCF, which then obtains the service profile for the wildcarded PSU from the HSS. This profile includes an IFC trigger which causes the S-CSCF to route the message to a Business Trunking (BT) application server. The application server replaces the SIP request URI "Tel:+31161255678" with the address of IP-PBX 2, namely "pbx2@operator2.com", and inserts the destination address into the To header field, deleting the previous content which is now lost.

It is then necessary to traverse a terminating CSCF complex, as the request URI has changed and hence a new terminating party is targeted. The message then arrives at a further I-CSCF which queries the HSS to determine the S-CSCF allocated to the PBX before delivering the message to that allocated S-CSCF. This S-CSCF knows the contact address for the PBX, and adds this as the new request URI. In order to preserve the old URI, "pbx2@operator2.com", the S-CSCF adds a P-Called-Party-Id containing this URI, before forwarding the message to a P-CSCF and delivery to the IP-PBX 2. Optionally, the second S-CSCF may forward the message to a further application server if triggers are activated in respect of the PBX identity.

In the case where the destination terminal is a SIP terminal, upon receipt of the message, IP-PBX 2 can arrange for delivery of the message to the terminal based upon the address contained in the "To" header field. If the destination terminal is not a SIP terminal, the IP-PBX 2 terminal will handle the termination according to some application specific logic.

The "workaround" solution illustrated in FIG. 2 has the disadvantage that it requires two traversals of a CSCF complex. This will result in increased message transit times. In addition, the information originally contained in the To header is lost, as is the original request URI that was inserted by the caller. Without the original To header, certain applications at the called terminal may not function.

FIG. 3 illustrates a workaround solution for the originating call case, i.e. where a terminal behind a PBX initiates a call to a remote terminal. In this case, as the outbound P-CSCF does not recognise the P-Preferred-Identity contained within the INVITE sent to it by the PBX, it uses as a default P-Asserted-Identity the PUI of the PBX, namely "pbx1@operator1.com". At the S-CSCF, and IFC of the PBX service profile tells the S-CSCF to involve the BT application server. The BT application server validates and asserts that the originating user is the user that is identified in the From header, and replaces the P-Asserted-Identity header with the identity of the calling user, namely "tel+31161241234". It then forwards the SIP INVITE it to the terminating user via the S-CSCF serving the PBX identity.

SUMMARY

It is an object of the present invention to provide a procedure and system which enables IP Multimedia Subsystem services to be made available to user terminals that are located within corporate networks or the like, and which do not have individual IP Multimedia Subsystem subscriptions. It is a further object of the present invention to achieve the first object in an efficient manner.

These and other objects are achieved by including within the Implicit Registration Set associated with a subscription, a wildcarded Public User Identity. "Wildcarded" or "wildcard" is understood here to mean a Public User Identity that contains a symbol or symbols that stands for one or more unspecified characters. The wildcarded Public User Identity will have a service profile associated with it. Any node within the IP Multimedia Subsystem which performs checks or processing based upon the Implicit Registration Set, will act upon a received Public User Identity matching a wildcarded Public User Identity in the same way as if the received Public User Identity matched any standard Public User Identity within the Implicit Registration Set. Rather than representing a range of Public User Identities using a wildcarded Public User Identities, such a range may instead be represented by a sub-domain. For example, a range of Tel URIs may be represented by a dialing prefix, whilst a range of SIP URIs may be represented by a corporate domain.

According to a first aspect of the present invention there is provided a method of facilitating access to services of an IP Multimedia Subsystem network by user terminals located behind an access point to said network. The access point is associated with a subscription to the IP Multimedia Subsystem network. The method comprises including within an Implicit Registration Set defined for said subscription, a wildcarded Public User Identity or Public User Identity sub-domain representative of a range of Public User Identities. At IP Multimedia Subsystem registration of said access point with the IP Multimedia Subsystem network, the Public User Identities contained in the Implicit Registration Set are distributed to a Serving Call Session Control Function allocated to said access point and to a Proxy Call Session Control Function to which said access point is attached.

Embodiments of the present invention make it possible to provide user terminals located within a corporate network or the like, and which do not themselves have IP Multimedia Subsystem subscriptions, with IP Multimedia Subsystem services including direct incoming and outgoing dialing. No additional S-CSCF complex traversals are required for signalling, and, important SIP header information is preserved.

Further aspects of the invention relate to a Serving Call Session Control Function, a Proxy Call Session Control Function, and a Home Subscriber Server, and methods of operating the same.

According to yet another aspect of the present invention there is provided a method of operating a Home Subscriber Server of an IP Multimedia Subsystem. The method comprises maintaining in respect of a subscription or service(s), data including an Implicit Registration Set containing a wildcarded Public Service Identity or Public Service Identity sub-domain representative of a range of Public Service Identities associated with a service or services, and an identity of a Serving Call Session Control Function allocated to said service(s) or criteria for allocating a Serving Call Session Control Function. Upon receipt of a location information request from an Interrogating Call Session Control Function in respect of a SIP message received at the Interrogating Call Session Control Function, if the request URI of the message matches said wildcarded Public Service Identity or sub-domain, the interrogating Call Session Control Function is informed of the identity of the Serving Call Session Control Function or provided with the selection criteria.

A further aspect of the invention provide for a computer program product loadable into the internal memory of a digital computer, comprising software code portions for performing the steps of the above method of operating a Home Subscriber Server. Further aspects provide for computer program products loadable into the Internal memory of a digital computer, comprising software code portions for performing the steps of operating a Serving Call Session Control Function, a Proxy Call Session Control Function, and an Interrogating Call Session Control Function in accordance with the present invention.

BRIEF DESCRIPTION

DETAILED DESCRIPTION OF CERTAIN EMBODIMENTS

Figure 1:
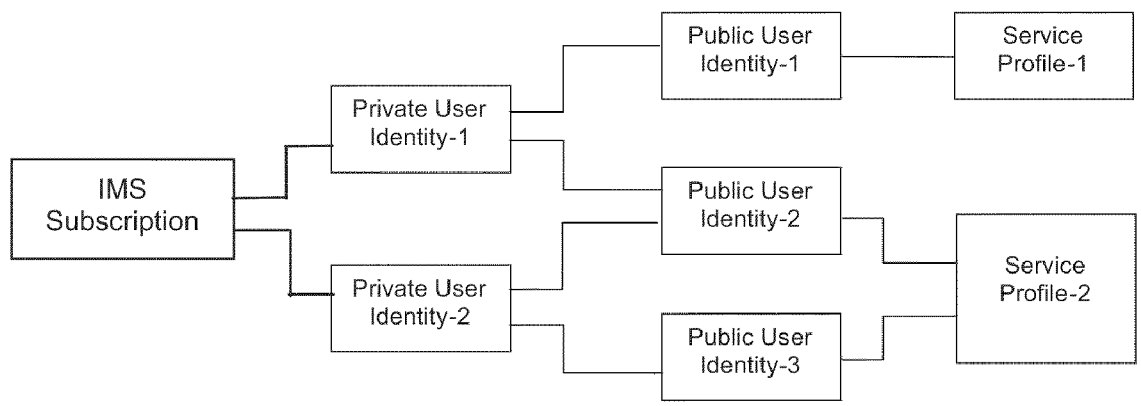
FIG. 1 illustrates schematically example relationships between a user IMS subscription and the Public and Private User Identities.
Figure 2:
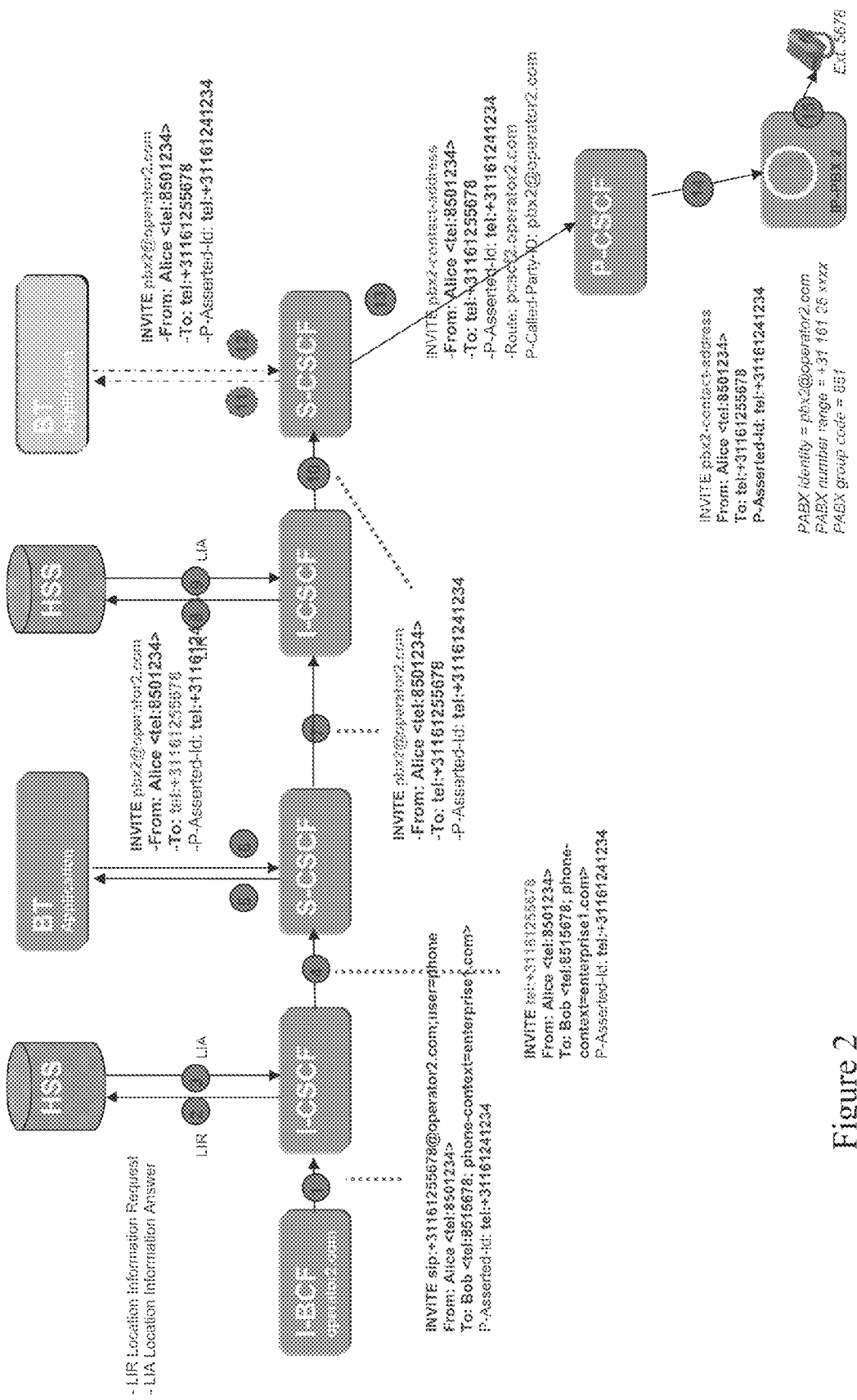
FIG. 2 illustrates schematically a prior art workaround solution for a terminating call case within an IMS architecture.
Figure 3:
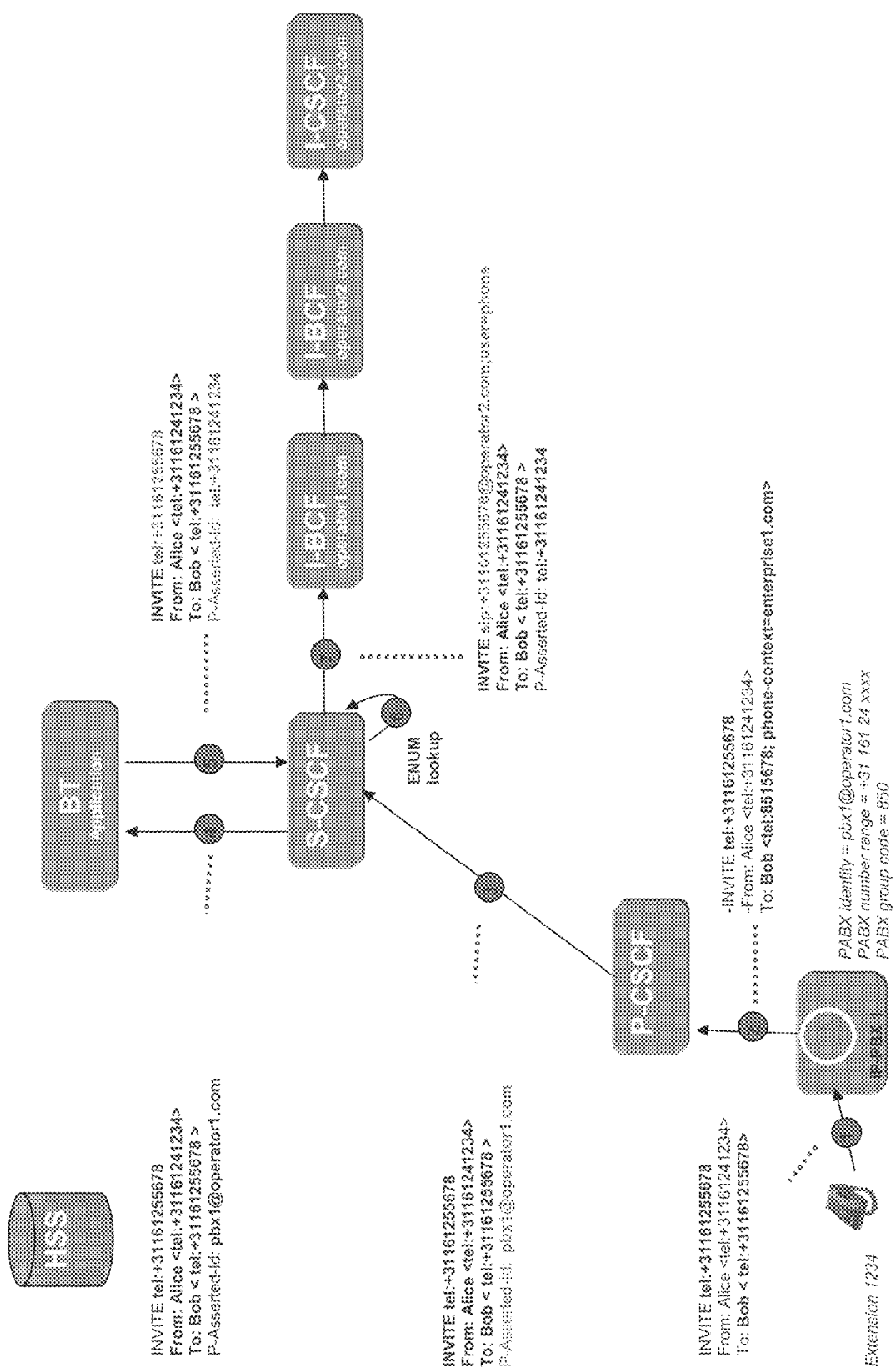
FIG. 3 illustrates schematically a prior art workaround solution for an originating call case within an IMS architecture.
Figure 4:
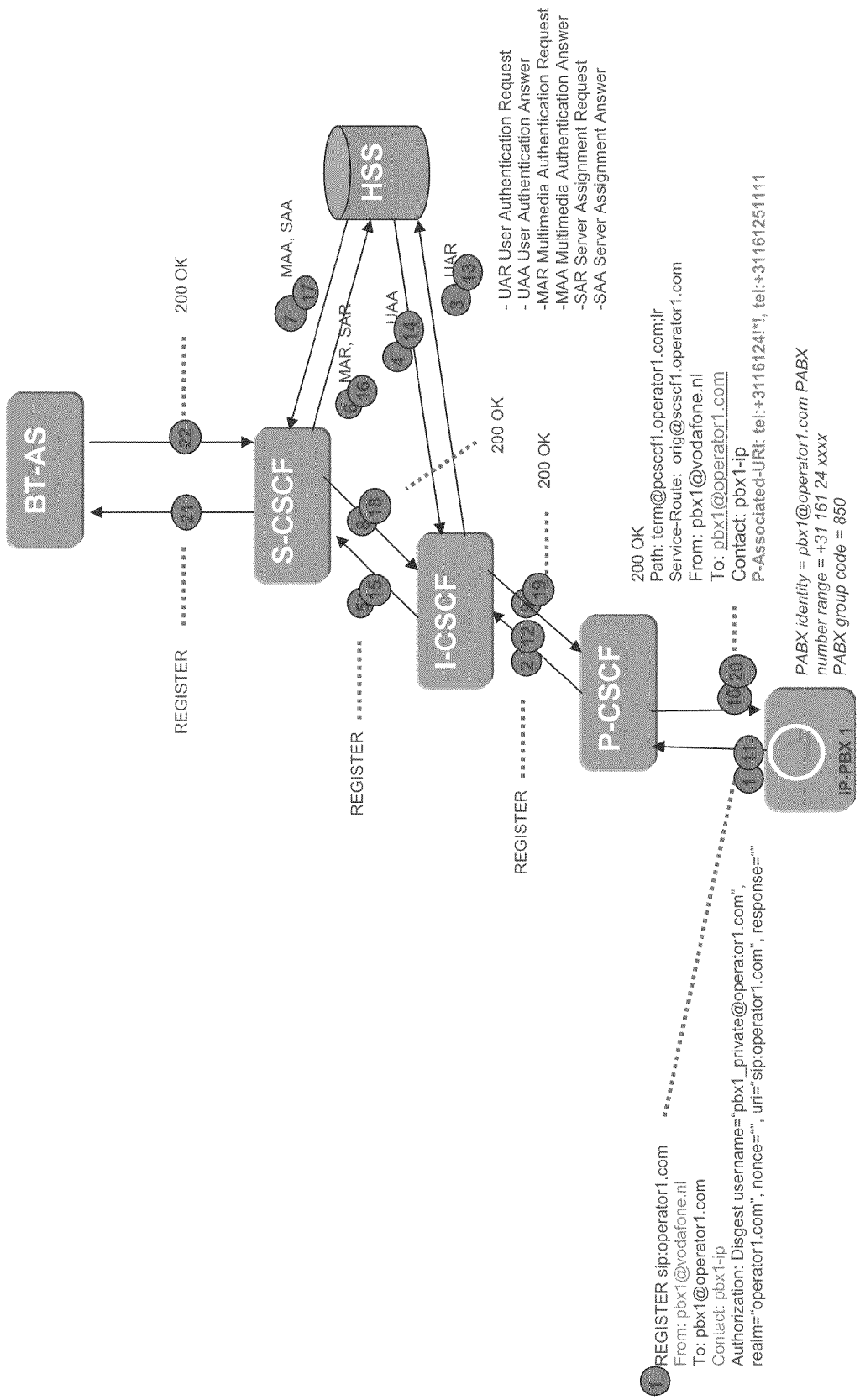
FIG. 4 illustrates schematically an IMS network architecture with a registration signalling flow according to an embodiment of the present invention.

IMS registration consists of two phases, During a first phase, the registering entity sends a SIP REGISTER to its P-CSCF which is forwarded via an I-CSCF to an S-CSCF which is allocated by the HSS. This register elicits a challenge (401 message) from the HSS and which is returned to the registering entity. That entity then sends out a further REGISTER containing a response to the challenge. In the case of a PBX (denoted IP-PBX 1) registering on behalf of a group of user terminals, the associated signalling flow is illustrated in FIG. 4, with the PBX learning the address of the outbound P-CSCF by way of a DHCP lookup. The PBX registers using its own PUI, in this example "pbx1@operator1.com". The subscription information held within the HSS for the PBX includes an Implicit Registration Set as discussed above. As well as the PBX's PUI and a tel URI: "tel:+31161251111" also allocated to the PBX, the Implicit Registration Set contains a "wildcard" PUI which represents a range of telephone extensions associated with the PBX. In this example, the wild card is denoted by "tel:+311612411", where the segment "!*!" indicates that a PUI having the specified prefix and any suffix will match the wildcard PUI.

The HSS returns the Implicit Registration Set in the Server Assignment Answer (signal 17 in FIG. 4) together with the associated service profile(s). The S-CSCF then sends the 200 OK back to the PBX via the I-CSCF and the P-CSCF, with the 200 OK including a P-Associated-URI field identifying the PUIs within the Implicit Registration Set associated with the PUI of the PBX.

Rather than the PBX performing the registration, this could be performed by a function that registers on behalf of the PBX. Such function could for example be located in a border node such as a Signalling Border Gateway. The border node may be located between the PBX and the P-CSCF or may contain the P-CSCF. Another example of a device that could host the registration function is an Integrated Access Device or Home Gateway at the customer premises.

Figure 5:
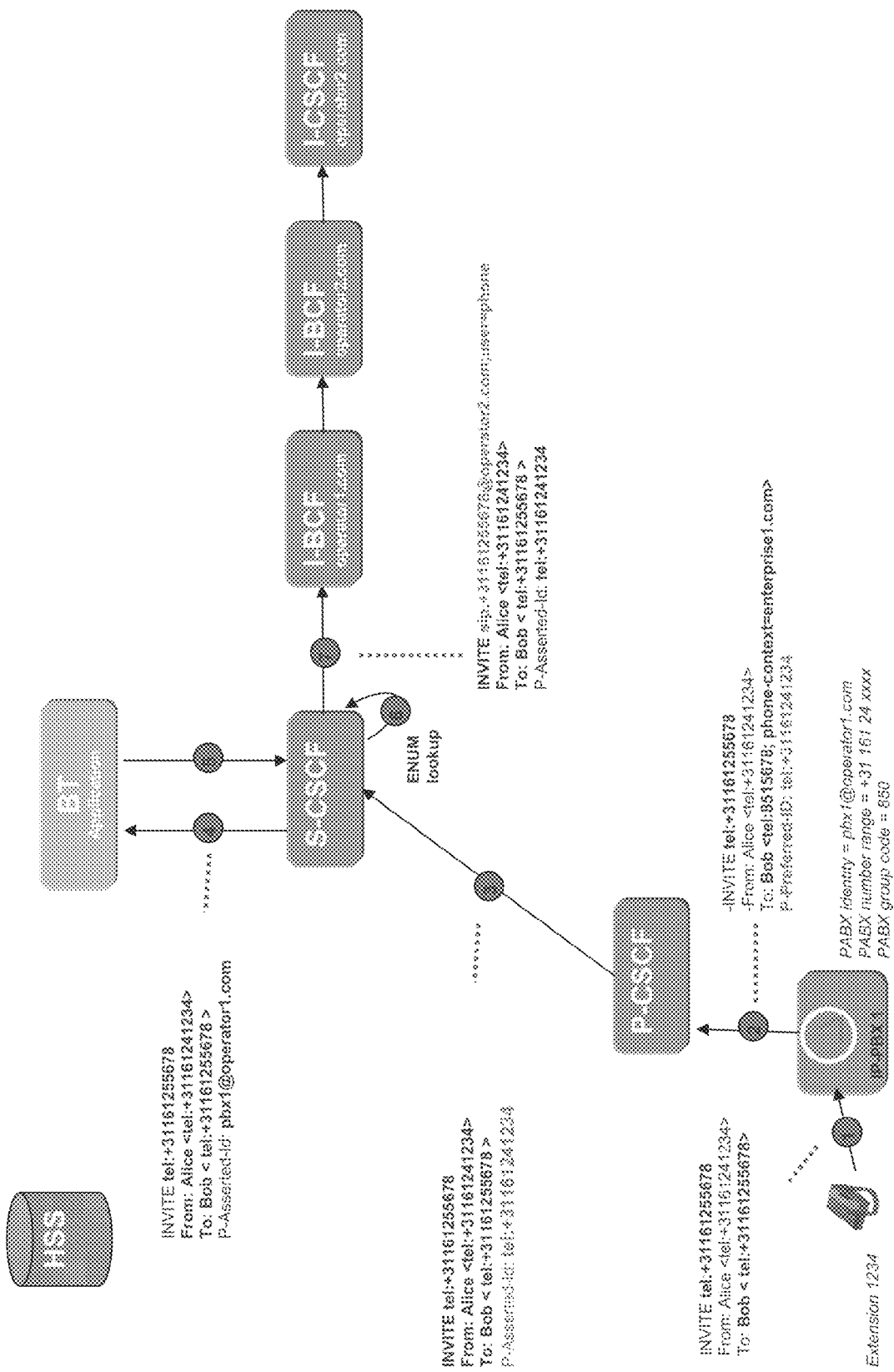
FIG. 5 illustrates an IMS network architecture with an originating case signalling flow according to an embodiment of the present invention.

Considering now the case where a user terminal behind the PBX wishes to originate a call to a remote terminal, and with reference to FIG. 5, this is signaled to the PBX by the user terminal (e.g. using SIP if the terminal is SIP enabled), The PBX then sends an INVITE to the P-CSCF serving as outbound proxy. The PBX includes as the P-Preferred-Identity header the (local) identity of the calling user, e.g. "tel:+31161241234". The service logic within the P-CSCF is conventionally arranged to validate the P-Preferred-Identity header, using the previously negotiated security association and the PUIs of the Implicit Registration Set. In addition, it determines that the P-Preferred-Identity header matches the wildcarded PUI contained in the Implicit Registration Set previously received from the S-CSCF. The P-CSCF then replaces the P-Preferred-Identity header with the P-Asserted-Identity header, using the same calling user PUI, and forwards the INVITE to the S-CSCF via the I-CSCF.

Upon receipt of the INVITE, the S-CSCF determines that the P-Asserted-Identity header matches the wildcarded PUI belonging to the Implicit Registration Set (already downloaded to the S-CSCF with the service profile during the registration phase), and the S-CSCF will apply the common group service profile using application servers if necessary (FIG. 5 illustrates a Business Trunking application server by way of example). All group members will receive the same group services and charges can be made against the group subscription. The S-CSCF performs an ENUM lookup operation on the request tel URI to identify the operator domain for that URI. It then creates the corresponding SIP URI, in this example "sip:+31161255678@operator2.com; user=phone"and substitutes this into the INVITE in place of the original request URI.

Call set up continues according to normal procedures. It will be noted that the Request URI, From, To, and P-Asserted-1D headers are not altered by the group handling operation (at least not in any manner that is different from that which occurs for normal, non-group users).

Figure 6:
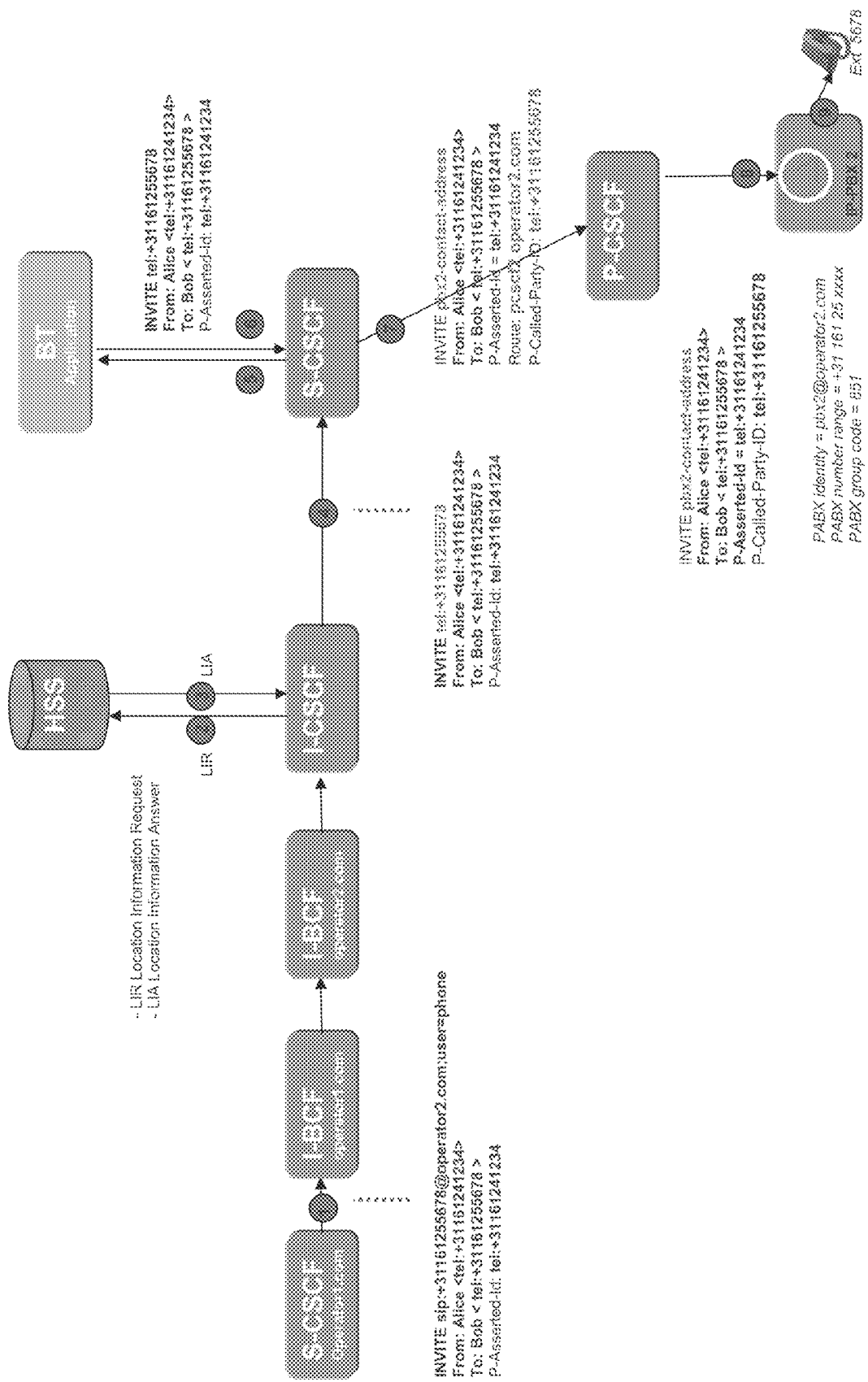
FIG. 6 illustrates an IMS network architecture with a terminating case signalling flow according to an embodiment of the present invention.

FIG. 6 illustrates the terminating case, where a remote terminal initiates an IMS call to a user terminal behind the PBX. When the I-CSCF within the PBX's home IMS network receives an INVITE request destined for a group member (having in this example the PUI "sip:+31161255678@operator2.com"), it will convert the SIP request URI to a TEL request URI, and perform a normal location information request to the HSS. As the destination PUI matches a wildcarded PUI within the Implicit Registration Set (namely "tel:+3116125!*!"), the I-CSCF will forward the request to the S-CSCF that has been allocated to the group user profile. At the S-CSCF, the normal terminating initial request handling is performed and after executing any required group services (utilising one or more application servers such as the illustrated business trunking application server), the request URI within the INVITE is replaced with PBX's contact address, i.e. "pbx2-contact-address". The original dialed terminating group member identity is retained in the P-Called-Party-ID header. As with the originating case (FIG. 5), the Request URI, To, From, and P-Asserted-Id are not altered by the group handling operation in a manner which differs from that which occurs for non-group members.

Upon reception of this INVITE, the PBX can forward the request to a SIP enabled group member by, for example, using the value of P-Called-Party-ID to construct a request URI, removing the P-Called-Party-ID, and forwarding this within the group's network.

Rather than the PBX performing the reconstruction of the Request URI, this could be performed by a function that performs the reconstruction before the INVITE is forwarded to the PBX. Such a function could for example be located in a border node such as a Signalling Border Gateway. The border node may be located between the PBX and the P-CSCF, or may contain the P-CSCF. Another example of a device that could host this function is an Integrated Access Device or Home Gateway at the customer premises.

It will be appreciated by the person of skill in the art that various modifications may be made to the above described embodiments without departing from the scope of the present invention. The approach described above may be applied, for example, to enable the inclusion within an Implicit Registration Set of a wildcarded Public Service Identity or Public Service identity sub-domain.

The invention claimed is:

1. A method of facilitating access to services of an IP Multimedia Subsystem (IMS) network by user terminals and services located behind an access point to said IMS network, the access point being associated with a subscription to the IP Multimedia Subsystem network, the method comprising:
   including within an Implicit Registration Set defined for said subscription:
   a wildcarded Public User Identity or Public User Identity sub-domain representative of a range of Public User Identities; and
   a wildcard Public Service Identity or Public Service Identity sub-domain representative of a range of Public Service Identities; and
   at IP Multimedia Subsystem registration of said access point with the IP Multimedia Subsystem network, distributing the Public User Identities and Public Service Identities contained in the Implicit Registration Set to a Serving Call Session Control Function (S-CSCF) allocated to said access point and to a Proxy Call Session Control Function (P-CSCF) to which said access point is attached.

2. The method according to claim 1, said Implicit Registration Set including at least one explicit Public User Identity of said access point.

3. The method according to claim 1, wherein said access point is an IP Private Branch Exchange.

4. The method according to claim 1, wherein said Implicit Registration Set is maintained within a Home Subscriber Server (HSS) of the IP Multimedia Subsystem, and is provided to the Serving Call Session Control Function at registration within a Server Assignment Answer (SAA) sent by the Home Subscriber Server, and to the Proxy Call Session Control Function in a P-Associated-URI header of a 200 OK sent from the Serving Call Session Control Function.

5. The method according to claim 1, wherein said Implicit Registration Set is maintained within a Home Subscriber Server of the IP Multimedia Subsystem, and is provided to the Serving Call Session Control Function after said subscription is modified, within a Push Profile Request sent by the Home Subscriber Server.

6. A method of operating a Proxy Call Session Control Function of an IP Multimedia Subsystem network, the method comprising:
  at registration of an access point (IP-PBX) having a subscription to the IP Multimedia Subsystem network, receiving and storing an Implicit Registration Set for the access point, the Implicit Registration Set including:
    a wildcarded Public User identity or Public User identity sub-domain representative of a range of Public User Identities, and
    a wildcarded Public Service Identity or Public Service identity sub-domain representative of a range of Public Service identities;
  receiving a Session Initiation Protocol message from said access point;
  if the P-Preferred-identity header of said message matches said wildcarded Public User identity, Public Service identity, Public User sub-domain or Public Service identity sub-domain, replacing the P-Preferred-identity header with a P-Asserted-identity header containing the same Universal Resource Identifier; and
  forwarding the message to an interrogating Call Session Control Function (I-CSCF).

7. A method of operating a Serving Call Session Control Function (S-CSCF) of an IP Multimedia Subsystem, the method comprising:
  at registration of an access point (IP-PBX) having a subscription to the IP Multimedia Subsystem network, receiving and storing an Implicit Registration Set for the access point, the Implicit Registration Set including:
    a wildcarded Public User identity or Public User Identity sub-domain representative of a range of Public User Identities;
    a wildcarded Public Service identity or Public Service Identity sub-domain representative of a range of Public Service identities; and
    a service profile associated with said wildcarded Public User Identity, Public Service Identity, Public User Identity sub-domain or Public Service Identity sub-domain;
  receiving a SIP message a) originating from or b) destined for a user terminal located behind said access point; and
  if the P-Asserted-identity of said message in a) or the request Universal Resource indicator of said message in b) matches said wildcarded Public User Identity, Public User Identity sub-domain or Public Service Identity sub-domain, applying standard IMS procedures according to the associated service profile.

8. A method of operating a Home Subscriber Server (HSS) of an IP Multimedia Subsystem, comprising:
  for an access point (IP-PBX) serving a plurality of user terminals and services, maintaining subscriber data including an Implicit Registration Set containing a wildcarded Public User Identity or Public User Identity sub-domain representative of a range of Public User Identities associated with said user terminals, said Implicit Registration Set further including a wildcarded Public Service Identity or Public Service Identity sub-domain representative of a range of Public Service Identities associated with said services and an identity of a Serving Call Session Control Function (S-CSCF) allocated to said access node or criteria for allocating a Serving Call Session Control Function; and
  upon receipt of a location information request (LIR) from an Interrogating Call Session Control Function (ICSCF) in respect of a SIP message received at the Interrogating Call Session Control Function, if the request URI of the message matches said wildcarded Public User Identity, Public Service Identity, Public User Identity sub-domain or Public Service Identity sub-domain, informing the Interrogating Call Session Control Function of the identity of the Serving Call Session Control Function or providing it with the selection criteria.

9. A method of operating a Home Subscriber Server of an IP Multimedia Subsystem, comprising:
  for an access point (IP-PBX) serving a plurality of user terminals and services, maintaining subscriber data including an Implicit Registration Set containing
    a wildcarded Public User Identity or Public User Identity sub-domain representative of a range of Public User Identities associated with said user terminals; and
    a wildcarded Public Service Identity or Public Service Identity sub-domain representative of a range of Public Service identities associated with said services; and
  providing said Implicit Registration Set to one or more of an Interrogating Call Session Control Function (I-CSCF), a Serving Call Session Control Function (S-CSCF), and a Proxy Call Session Control Function (P-CSCF).

10. The method according to claim 9, wherein the Implicit Registration Set is provided at registration of a subscription for said access point, or upon receipt of a session setup request when said subscription is unregistered.

11. The method according to claim 10, wherein the Implicit Registration Set is provided upon receipt of a session setup request when said subscription is unregistered, the method further comprising first matching a request URI of said request against said wildcarded Public User Identity, Public Service Identity, Public User Identity or Public User Identity sub-domain, and providing said Implicit Registration Set if a match is confirmed.

12. A computer adapted to implement a Proxy Call Session Control Function (P-CSCF) for use in an IP Multimedia Subsystem (IMS) network, the computer comprising:
  means for receiving, at registration of an access point having a subscription to the IP Multimedia Subsystem network, and store an Implicit Registration Set for the access point (IP-PBX), the Implicit Registration Set including:
    a wildcarded Public User Identity or Public User Identity sub-domain representative of a range of Public User Identities, and a wildcarded Public Service Identity or Public Service Identity sub-domain representative of a range of Public Service Identities associated with said services; and means for receiving a Session Initiation Protocol message from said access point;

means arranged, if the P-Preferred-identity header of said message matches said wildcarded Public User identity, Public Service identity, Public User Identity sub-domain Public Service Identity sub-domain, for replacing the P-Preferred-identity header with a P-Asserted-identity header containing the same Universal Resource identifier; and means for forwarding the message to an Interrogating Call Session Control Function (I-CSCF).

13. A computer adapted to implement a Serving Call Session Control Function (S-CSCF) for use in an IP Multimedia Subsystem, the computer comprising:

means for receiving and storing, at registration of an access point (IP-PBX) having a subscription to the IP Multimedia Subsystem network, an Implicit Registration Set for the access point, the Implicit Registration Set including:
a wildcarded Public User Identity or Public User Identity sub-domain representative of a range of Public User Identities:
a wildcarded Public Service Identity or Public Service Identity sub-domain representative of a range of Public Service Identities; and
a service profile associated with said wildcarded Public User Identity or sub-domain;

means for receiving a SIP message a) originating from or b) destined for a user terminal or service located behind said access point; and means for applying, if the P-Asserted-identity of said message in a) or the request Universal Resource Indicator of said message in b) matches said wildcarded Public User Identity, Public Service identity, Public User Identity sub-domain or Public Service Identity sub-domain, standard service logic including the associate service profile.

14. A computer adapted to implement a Home Subscriber Server (HSS) of an IP Multimedia Subsystem, comprising:

means adapted, for an access point serving a plurality of user terminals and services, to maintain subscriber data including an Implicit Registration Set containing
a wildcarded Public User Identity or Public User Identity sub-domain representative of a range of Public User Identities associated with said user terminals,
a wildcarded Public Service Identity or Public Service Identity sub-domain representative of a range of Public Service Identities,
and an identity of a Serving Call Session Control Function (C-CSCF) allocated to said access node or criteria for allocating a Serving Call Session Control Function; and means adapted for determining, upon receipt of a location information request from an Interrogating Call Session Control Function (I-CSCF) with respect to a SIP message received at the Interrogating Call Session Control Function, if the request URI of the message matches said wildcarded Public User Identity, Public Service Identity, Public User Identity sub-domain or Public Service Identity sub-domain, and if so, informing the interrogating Call Session Control Function of the identity of the Serving Call Session Control Function or providing it with the selection criteria.

* * * * *

UNITED STATES PATENT AND TRADEMARK OFFICE
CERTIFICATE OF CORRECTION

PATENT NO.      : 8,150,969 B2
APPLICATION NO. : 13/222093
DATED           : April 3, 2012
INVENTOR(S)     : Van Elburg et al.

Page 1 of 2

It is certified that error appears in the above-identified patent and that said Letters Patent is hereby corrected as shown below:

In Fig. 4, Sheet 4 of 6, delete " 200 OK / Path: term@pcscf1.operator1.com;lr / Service-Route: orig@scscf1.operator1.com " and insert -- 200 OK / Path: term@pcscf1.operator1.com;lr / Service-Route: orig@scscf1.operator1.com --, therefor.

In Column 1, Line 28, delete "Interaction" and insert -- interaction --, therefor.

In Column 1, Line 43, delete "(PCSCF)" and insert -- (P-CSCF) --, therefor.

In Column 2, Line 47, delete "users" and insert -- user's --, therefor.

In Column 3, Line 34, delete "Identities)," and insert -- Identities). --, therefor.

In Column 3, Line 39, delete "(FC)" and insert -- (iFC) --, therefor.

In Column 3, Line 54, delete ""implicit" and insert -- "Implicit --, therefor.

In Column 3, Line 67, delete "theft" and insert -- their --, therefor.

In Column 4, Line 22, delete ""Ext," and insert -- "Ext. --, therefor.

In Column 5, Line 19, delete ""tel+" and insert -- "tel:+ --, therefor.

In Column 6, Line 24, delete "interrogating" and insert -- Interrogating --, therefor.

In Column 6, Line 32, delete "Internal" and insert -- internal --, therefor.

In Column 6, Line 63, delete "phases," and insert -- phases. --, therefor.

In Column 7, Line 14, delete "tel:+311612411"," and insert -- tel:+3116124!*!", --, therefor.

In Column 7, Line 35, delete "enabled)," and insert -- enabled). --, therefor.

Signed and Sealed this
Seventeenth Day of July, 2012

David J. Kappos
*Director of the United States Patent and Trademark Office*

CERTIFICATE OF CORRECTION (continued)
U.S. Pat. No. 8,150,969 B2

In Column 7, Line 67, delete "1D" and insert -- ID --, therefor.

In Column 8, Line 22, delete "Id" and insert -- ID --, therefor.

In Column 8, Line 45, delete "identity" and insert -- Identity --, therefor.

In Column 9, Line 27, in Claim 6, delete "identity or Public User identity" and insert -- Identity or Public User Identity --, therefor.

In Column 9, Line 31, in Claim 6, delete "identity" and insert -- Identity --, therefor.

In Column 9, Line 36, in Claim 6, delete "identity," and insert -- Identity, --, therefor.

In Column 9, Line 37, in Claim 6, delete "identity," and insert -- Identity, --, therefor.

In Column 9, Line 41, in Claim 6, delete "interrogating" and insert -- Interrogating --, therefor.

In Column 9, Line 50, in Claim 7, delete "identity" and insert -- Identity --, therefor.

In Column 9, Line 53, in Claim 7, delete "identity" and insert -- Identity --, therefor.

In Column 9, Line 63, in Claim 7, delete "indicator" and insert -- Indicator --, therefor.

In Column 10, Line 18, in Claim 8, delete "(ICSCF)" and insert -- (I-CSCF) --, therefor.

In Column 10, Line 38, in Claim 9, delete "identities" and insert -- Identities --, therefor.

In Column 10, Line 67, in Claim 12, delete "Identities," and insert -- Identities; --, therefor.

In Column 11, Line 8, in Claim 12, delete "identity," and insert -- Identity, --, therefor.

In Column 11, Line 9, in Claim 12, delete "identity," and insert -- Identity, --, therefor.

In Column 11, Line 9, in Claim 12, delete "sub-domain" and insert -- sub-domain or --, therefor.

In Column 11, Lines 12-13, in Claim 12, delete "identifier;" and insert -- Identifier; --, therefor.

In Column 11, Line 26, in Claim 13, delete "Identities:" and insert -- Identities; --, therefor.

In Column 12, Line 4, in Claim 13, delete "identity," and insert -- Identity, --, therefor.

In Column 12, Line 19, in Claim 14, delete "(C-CSCF)" and insert -- (S-CSCF) --, therefor.